United States Patent [19]

Meier et al.

[11] Patent Number: 5,321,070
[45] Date of Patent: Jun. 14, 1994

[54] ADHESION PROMOTERS FOR RUBBER AND SYNTHETIC MIXTURES

[75] Inventors: Karl Meier, Alfter; Udo Goerl, Bornheim-Roisdorf; Siegfried Wolff, Bornheim-Merten, all of Fed. Rep. of Germany

[73] Assignee: Degussa Aktiengesellschaft, Frankfurt am Main, Fed. Rep. of Germany

[21] Appl. No.: 8,563

[22] Filed: Jan. 22, 1993

[30] Foreign Application Priority Data

Jan. 25, 1992 [DE] Fed. Rep. of Germany ....... 4202023

[51] Int. Cl.$^5$ .......................... C08K 3/36; C08K 5/13; C08L 61/12
[52] U.S. Cl. .................................. 524/493; 524/492; 524/496; 423/339
[58] Field of Search ...................... 524/492, 493, 496; 423/339

[56] References Cited

U.S. PATENT DOCUMENTS 4,260,454 4/1981 Wason et al. .................... 162/181.7

*Primary Examiner*—Paul R. Michl
*Assistant Examiner*—Olga Asinovsky
*Attorney, Agent, or Firm*—Beveridge, DeGrandi, Weilacher & Young

[57] ABSTRACT

The invention relates to mixtures including resorcinol and silica which are used as adhesion promoters for improving the adhesion between textile or metal strength carriers and rubber or plastics. The mixtures in accordance with the invention exhibit a sharply limited sublimation behavior with regard to the resorcin.

10 Claims, No Drawings

ADHESION PROMOTERS FOR RUBBER AND SYNTHETIC MIXTURES

BACKGROUND OF THE INVENTION

This invention relates to mixtures of resorcinol (also known as resorcin or 1,3-benzenediol) and silica, which mixtures are used as adhesion promoters in rubber mixtures and synthetic plastic mixtures. The invention also relates to the silicas which can be used in these mixtures.

The use of adhesion reinforcers to improve the adhesion between rubber and textile strength carriers, such as polyamides, aramides, celluloses, and polyesters or bare, galvanized, or brass-coated steel cord is known.

There are two possibilities available for the direct addition of the adhesion reinforcers to the raw rubber mixture (i.e., dry bonding). In the case of steel cord (e.g., steel belts in tires, high-pressure hoses, or conveyor belts with steel inserts), adhesion reinforcers in the form of the divalent salts of cobalt (e.g., cobalt naphthenate) or resorcinol/formaldehyde/silica systems are used. In the case of textile cord, only the resorcinol/formaldehyde/silica system is used as adhesion reinforcement.

Both of these systems exhibit various disadvantages. The cobalt based system has poor ageing behavior. The resorcinol/formaldehyde/silica system for rubber has poisoning problems. Furthermore, the resorcinol based system has disadvantages in that the resorcinol tends to sublime, is toxic, and has poor dispersability.

In the early stages of the development of the resorcinol/formaldehyde/silica system, there was the problem of the poor dispersing behavior of resorcinol. It was known that this could be improved only by utilizing an incorporation temperature of approximately 120° C. (i.e., above the melting point of resorcinol). However, these high temperatures are not achieved by all mixtures in practice. One possibility for solving this problem included the fine grinding of resorcinol with silica, as described in German Patent No. 13 01 478 (Degussa adhesive system Cofill ® 11), or in the grinding of resorcinol with stearic acid. This German patent is entirely incorporated herein by reference. In addition, an attempt was made to improve the dispersion of resorcinol by means of a suitable mixing technique and mixing units, and in this manner, to use resorcinol in pure form for economic reasons.

However, these measures were not able to eliminate the problems stemming from the sublimation tendency of resorcinol, at the temperatures which are necessary for the production of articles of rubber and plastic. Since it can not be precisely determined in practice how much of the resorcinol added to the mixture will evaporate due to sublimation, sharp variations and inhomogeneities in the adhesion values can not be avoided.

Moreover, there are problems and health risks posed for employees due to the presence of sublimating resorcinol. These problems and risks must be considered. Resorcinol, especially resorcinol vapors, are regarded as injurious to the health. They have an irritating effect on the respiratory system and result in irritations of the eyes and skin (based on the disclosure from the British Rubber Manufacturers Association Ltd., Toxicity and Safe Handling of Rubber Chemicals, Third Edition, 1990). Therefore, the rubber industry increasingly requires measures which counteract the sublimation tendency of resorcinol from the manufacturers of resorcinol and of adhesive systems based on resorcinol. A development intended to aid this problem is the use of so-called resorcinol precondensates. A resorcinol resin is formed thereby by means of a purposeful reaction of resorcinol with a suitable formaldehyde donor outside of the actual mixing production.

This purposeful increase in the molecular weight of resorcinol (di-resorcinol, tri-resorcinol and oligomeric resorcinol developed from the monomeric parent substance) sharply reduces the sublimation behavior of resorcinol. In the actual application of this higher-molecular weight resorcinol in rubber, the actual resorcinol-formaldehyde resin network necessary for the cord and rubber adhesion is then built up together with a further formaldehyde donor. However, the precondensates produced in accordance with the above-described methods exhibit the disadvantage of high cost, as well as a few serious technical disadvantages. Du to the partial occupation of the reactive centers of the resorcinol for the resinification (i.e., gumming) during the precondensation, the reactivity for the actual resorcinol formaldehyde resin formation in the rubber mixture decreases considerably, relative to the reactivity of free resorcinol. This distinctly affects the vulcanization speed, results in a modulus which is distinctly lower relative to resorcinol, and a lower hardness value, as well as a lower adhesion value, especially on bare steel cord. These technical deficiencies oppose the use of precondensates in the rubber industry.

SUMMARY OF THE INVENTION

The invention relates to resorcinol which is available in a form for use in adhesive mixtures in which the effectiveness does not suffer in comparison to the state of the art, but which results at the same time in a distinctly limited sublimation behavior of the resorcinol.

The invention is constituted by mixtures comprising 5 to 95% by weight resorcinol and 95 to 5% by weight precipitated silica, wherein the silica used in the mixture exhibits a pH of greater than 8 in an aqueous suspension (according to DIN 53200). The specific surface of the silica (as determined by the BET method with nitrogen according to ISO 5794/1, Annex D) is advantageously between 30 and 1000 $m^2/g$, and between 125 and 250 $m^2/g$ is particularly preferred.

The mixtures may be produced continuously or discontinuously in known mixing units. In one advantageous embodiment of the invention, these mixtures, which are present as powder, are converted according to the method described in German Patent Publication DE-OS 40 13 258 into a granular form. DE-OS 40 13 258 is entirely incorporated herein by reference.

This invention has the further advantage that the work can be performed with a product which is especially low in dust. Mixtures with a content of 30 to 70% by weight resorcinol and 70 to 30% by weight silica are especially advantageous.

DETAILED DESCRIPTION OF THE INVENTION

Silica which can be used in the mixtures according to the invention is characterized in that the silica is first precipitated according to known methods out of a solution of water glass with sulfuric acid. The silica is filtered off and washed ($Na_2SO_4$ content <0.5% by weight). Then the filter cake, which exhibits an acidic pH, is liquified with sodium hydroxide solution and diluted while introducing shearing energy. The pH is adjusted to the desired range of preferably 9 to 10, and then a spray-dried silica is obtained from the suspension or the desired silica is obtained by means of another filtering off and drying, with the water content generally being about 4 to 7%, preferably about 4.5 to 6.5% by weight. The concentration of the sodium hydroxide solution is generally between 20 and 50% by weight, with 25 to 35% being particularly preferred. The sodium hydroxide is added to the filter cake at a temperature generally in the range of 20 to 40° C. until a pH of 8 to 10 has been attained. In the preferred instance, the sprayability of the suspension obtained in this manner has been maintained.

The consistency of the filter cake taken up with sodium hydroxide solution is preferably 18 to 21% by weight solid matter relative to the total amount of the suspension.

The method for granulating is characterized in that mixtures of 5 to 95% by weight resorcinol and 5 to 95% precipitated silica are transported by conveyor worms to two press rollers whose axes (i.e., shafts) are attached vertically one above the other and whose contact pressure can be varied. These ingredients are compacted there, such that a granulate with the desired maximum particle size is obtained with the aid of a cake breaker. The remaining dusty portion is separated.

The contact pressure of the rollers, whose surface can be smooth or structured, is generally adjusted to a value between 6 and 105 bars, with from 6 to 25 bars being particularly preferred.

With regard to the sublimation tendency, a comparison between the resorcinol precondensates and the mixtures of the invention shows a similar behavior; however, upon use in rubber mixers, it turns out that the mixtures of the invention are distinguished by distinctly greater vulcanization speeds, a higher modulus, greater strength and better adhesion values, especially on bare steel cord.

The mixtures produced in accordance with the invention (as a powder or granulate) are used in vulcanizable rubber mixtures containing resorcinol and silica, the so-called "adhesion mixtures." Various adhesion mixtures described in German Patent No. 10 78 320 and in Sprung, J., Burmester, K., Kautschuk and Gummi, 33, 611–616 (1980) are cited by way of example. They contain 1 to 10 parts by weight, preferably 1.5 to 5 parts by weight, resorcinol relative to 100 parts by weight rubber. The above-cited documents are entirely incorporated herein by reference.

The adhesion reinforcement is based on the formation of a resorcinol/formaldehyde resin. To this end, the mixture must contain, in addition to the resorcinol/silica mixture of the invention at a pH greater than 8, a formaldehyde donor (e.g., Hexa K from Degussa or Cohedur® A from BAYER) in amounts of 0.5 to 10 parts by weight, preferably 1 to 3 parts by weight. In addition, it is necessary for good adhesion, especially on steel cord, that silicas, like those known for this use, are present in the mixture of rubber or plastic in an amount of 1 to 50 parts by weight, especially 10 to 25 parts by weight, relative in each instance to 100 parts by weight rubber.

Suitable rubber types for use in accordance with this invention include rubbers and their mixtures which can be cross-linked with sulfur, as well as with vulcanization accelerator(s), to elastomers. In particular, these are the halogen-free rubber types, preferably the so-called "diene elastomers." These rubber types include e.g., oil-extended, natural and synthetic rubbers such as natural rubbers, butadiene rubbers, isoprene rubbers, butadiene-styrene rubbers, butadiene-acrylonitrile rubbers, butyl rubbers, ter-polymers of ethylene, propylene and non-conjugated dienes. Furthermore, the following additional rubbers can be considered for rubber mixtures for use in accordance with the invention: carboxyl rubbers, epoxide rubbers, transpolypentenamer, halogenated butyl rubbers, rubbers of 2-chloro-butadiene, ethylene-vinyl acetate copolymers, ethylene-propyl copolymers, optionally also chemical derivatives of natural rubber as well as modified natural rubbers.

Moreover, the rubber mixtures provided with the resorcinol/silica mixture of the invention can also contain further components customary in the rubber industry such as:

customary strengthening systems, such as furnace blacks, channel blacks, lampblacks, thermal blacks, acetylene blacks, arc blacks, CK blacks, etc.; synthetic fillers, such as silicas, silicates, aluminum oxide hydrates, calcium carbonates; natural fillers like clays, siliceous chalks, chalks, talcum, etc.; or silane-modified fillers;

customary vulcanization accelerators used in the rubber industry (e.g., sulfenamides, mercaptobenzothiazols, mercaptobenzothiazyl disulfides, triazine accelerators, thiurams) alone or in a mixture in amount of 0.1 to 10 parts by weight relative to 100 parts by weight rubber;

antiscorchers (retarders) such as, Vulkalent E: (N-trichloromethylthiophenylsulfonyl)-benzene, or PVI: N-(cyclohexylthio)phthalimide, likewise in amounts of 0.1 to 10 parts by weight relative to 100 parts by weight rubber;

ZnO and sterolic acid as promoters of the vulcanization in amounts of 0.5 to 10 parts by weight relative to 100 parts rubber;

antioxidants, antiozonants and anti-flex-cracking antioxidants used in the rubber industry, such as IPPD: N-isopropyl-N-phenyl-p-phenylene diamine, or TMQ: 2,2,4-trimethyl-1,2-dihydroquinoline, as well as waxes as light stabilizers (agents for protection against light) and their blends;

any softeners desired, such as, aromatic, naphthenic, paraffinic, and synthetic softeners and their blends;

optionally, silanes, such as bis-(3-triethoxysilylpropyl)tetrasulfane, chloropropyltriethoxy silane, mercaptopropyltrimethoxy silane, vinyl trialkoxy silanes and their blends in an amount of 0.1 to 20 parts by weight, preferably 1 to 10 parts by weight per 100 parts by weight silica;

optionally, sulfur in an amount of 0.1 to 10 parts by weight per 100 parts by weight rubber; and optionally, dyes and auxiliary processing agents in normal dosages known to those skilled in this art.

The mixing production takes place in a manner known to those skilled in the rubber industry, in an internal mixer or on a rolling mill.

The range of application of the mixtures of the invention extends to adhesion mixtures like those usually used in tire construction, e.g., in the belt, carcass and bead ring areas of the tire, as well as to industrial articles with strength carriers including textile cord or steel cord. Examples of such articles are conveyor belts, V-belts, hoses and in some instances, seals and rubber-coated fabrics. Such materials can be made by standard processes known to those skilled in these arts.

The mixtures produced in accordance with the invention exhibit substantially no tendency toward sublimation. Rubber vulcanizates produced with these mixtures exhibit, when compared with vulcanizates produced with resorcinol precondensates, distinctly better adhesive, and rubber-technology properties.

EXAMPLES

Particular embodiments of the invention will be described in conjunction with the following Examples. These Examples are intended to illustrate the invention and not limit the same.

EXAMPLE 1

Continuous production of the resorcinol/silica mixture is described as follows:

100 kg/h silica with a pH of 9, and a specific surface of 175 m$^2$/g and 100 kg resorcinol are passed gravimetrically into a Gericke mixer. The two components are homogenized via built-in mixing coils rotating at a speed of 120 rpms. After a dwell time of 40 seconds, the mixed material leaves the mixer via a hollow worm and is supplied to further processing.

EXAMPLE 2

Discontinuous production of the resorcinol/silica mixture is described as follows:

150 kg silica having a pH of 9, and a specific surface of 175 m$^2$/g and 150 kg resorcinol are charged into a truncated-cone mixer of the ALPINE company provided with a spiral tube. These ingredients are subsequently mixed for 30 minutes. After expiration of the homogenizing time, the finished mixed material is discharged from the mixer and supplied to further processing.

EXAMPLE 3

This Example relates to a comparison of the sublimation behavior of resorcinol/Ultrasil ® VN 3 (which is commercially available) in a 1:1 mixture, and resorcinol/silica in accordance with the invention (pH=9) in a 1:1 mixture.

100 mg of a mixture of resorcinol and Ultrasil ® VN 3 (having a pH of 6.2) and 100 mg of a mixture of resorcinol and silica (having a pH of 9) are heated in succession to 150° C. in a sublimation apparatus with a water-cooled sublimation finger for a total of 3 hours. During this time, a deposit of sublimated resorcinol was able to be observed on the cooling finger. The determination of the separated amount of resorcinol, carried out in each instance after 60 minutes by means of a weighing out, resulted after 3 hours in a constant weight of both mixtures; i.e., all of the available resorcinol sublimed out and the weight of the mixture remained constant after 3 hours. The following amounts of sublimate (in percent) were weighed out after this time:

| | |
|---|---|
| Resorcinol/Ultrasil ® VN3 (Cofill 11) (ph = 6.2) | 39% |
| Resorcinol/silica (pH = 9) | 1% |

The results show that mixtures in accordance with the invention are practically free of sublimation and show substantially no tendency to sublimate. The amount of sublimate found according to this analytical method is in the size range of the resorcinol precondensates, such as Penacolite B 20 S (max. 2% free resorcinol; data of the producer) and is distinctly lower than that of traditional resorcinol mixtures or naturally occurring resorcinol itself.

The following names, test norms and abbreviations are used in the above examples and in the following example of the use of the mixtures in accordance with the invention:

| Test norms for use: | Test method | Unit |
|---|---|---|
| $D_{max}$-$D_{min}$ | DIN 53529 | nm |
| Yield strength 300% | DIN 53504 | Mpa |
| Shore-A-hardness | DIN 53505 | |
| Adhesion | in a length of 1 cm | |
| (bare steel cord) | steel cord which had been vulcanized is torn out on a tensile-strength machine (N/cm) | |
| Materials used: | | |
| RSS1 | ribbed smoked sheet - natural rubber | |
| Natsyn ® 2200 | polyisoprene rubber | |
| CORAX ® N 330 | carbon black, specific surface, BET: 82 m$^2$/g (available from Degussa) | |
| Ultrasil ® VN3 | precipitated silica, specific surface 175 m$^2$/g, pH: 6.2 | |
| Naftolen ® ZD | aromatic softener | |
| Vulkanox ® HS | 2,2,4-trimethyl-1,2-dihydroquinoline, available from BAYER | |
| Hexa K | hexamethylene tetramine, available from Degussa | |
| Vulkacit ® DZ | benzothiazyl-2-dicyclohexylsulfenamide | |
| Cofill ® 11 | powdery mixture of resorcinol/VN 3 50:50, available from Degussa | |
| Crystex ® OT 20 A | insoluble sulfur | |
| Penacolite B 20 S | resorcinol precondensate available from the firm Inspec, with a free resorcinol content of approximately 2% | |
| Silica | pH: 9, specific surface of 175 m$^2$/g | |

EXAMPLE 4

This Example is a comparison between an adhesion mixture made with a resorcinol precondensate (Penacolite B 20 S) (Test 1) and a 1:1 mixture prepared in accordance with the invention (Test 2).

The following ingredients were mixed in a rubber material:

| | Test 1 | Test 2 |
|---|---|---|
| RSS 1 | 30 | 30 |
| Natsyn ® 2200 | 70 | 70 |
| CORAX ® N 330 | 45 | 45 |
| Ultrasil ® VN 3 | 15 | 12.5 |
| ZnO RS | 8 | 8 |
| Stearic acid | 1 | 1 |
| Naftolen ® ZD | 3 | 3 |
| Vulkanox ® HS | 1 | 1 |
| Penacolite B 20 S | 2.5 | — |
| 1:1 resorcinol/silica pH = 9 | — | 5 |
| Hexa K | 1.5 | 1.5 |
| Vulkacit ® DZ | 0.7 | 0.7 |
| Crystex ® OT 20 A | 5 | 5 |
| Rheometer data: 145° C., | | |
| $D_{max}$-$D_{min}$ (nm) | 13.2 | 13.93 |
| T 95% | 73.8 | 68.7 |
| T 90-t 10% | 53.4 | 48.9 |
| Vulcanization data: 145° C., T 95% | | |
| Modulus 300% MPa | 13.7 | 17.3 |
| Hardness | 78 | 82 |
| Adhesion bare steel cord (average value from 10 measurements) N/cm | 83 | 124 |

This data shows that the material in accordance with the invention (Test 2) has an improved modulus, hardness and adhesion over materials made using the commercially available Peracolite B 20 S resorcinol/silica mixture.

Those skilled in the art will recognize that various changes and modifications may be made without departing from the spirit and scope of the invention as described in the claims appended hereto.

The priority application, German Patent Application No. P 42 02 023.9 filed in Germany on Jan. 25, 1992 is relied on and entirely incorporated herein by reference.

We claim:

1. A mixture consisting essentially of 5-95% by weight resorcinol and 95-5% by weight precipitated silica, wherein the silica has a pH of greater than 8 in a 5% aqueous suspension, such that the resorcinol in the mixture has a substantially reduced tendency to sublime.

2. A mixture according to claim 1, wherein the mixture is present in a granulated form.

3. A mixture according to claim 1, wherein the mixture is present in a powdered form.

4. A silica for use in a mixture having 5-95% resorcinol and 95-5% by weight precipitated silica, wherein the silica is produced by a process comprising:
   precipitating silica out of a solution of water glass with sulfuric acid;
   filtering off liquid from the solution to provide a filter cake;
   liquefying the filter cake, which exhibits an acidic pH, with a dilute sodium hydroxide solution in order to thereby obtain a suspension; and
   obtaining silica from the suspension by spray-drying or by a filtering and drying technique, wherein the silica obtained from the suspension has a pH of greater than 8 in a 5% aqueous suspension, whereby when the silica is used in the mixture with resorcinol, the resorcinol in the mixture has a substantially reduced tendency to sublime.

5. The silica according to claim 4, wherein the silica has a specific surface of 30 to 1000 $m^2/g$.

6. The silica according to claim 5, wherein the specific surface is in the range of 125 to 250 $m^2/g$.

7. A mixture comprising 5-95% by weight resorcinol and 95-5% by weight precipitated silica, wherein the silica has a pH of greater than 8 in a 5% aqueous suspension, wherein the mixture exhibits substantially no tendency to sublimate.

8. The mixture according to claim 7, wherein the mixture is present in granulated form.

9. The mixture according to claim 7, wherein the mixture is present in powder form.

10. A mixture comprising 5-95% by weight resorcinol and 95-5% by weight precipitated silica, wherein the silica has a pH of greater than 8 in a 5% aqueous suspension, such that the resorcinol in the mixture has a substantially reduced tendency to sublime, wherein the silica is produced by the process comprising the steps of:
    precipitating silica out of a solution of water glass with sulfuric acid;
    filtering off liquid from the solution to obtain a filter cake;
    liquefying the filter cake, which exhibits an acidic pH, with a dilute sodium hydroxide solution, in order to hereby obtain a suspension; and
    obtaining the silica from the suspension by spray-drying or by a filtering and drying technique.

* * * * *